US010240268B2

(12) United States Patent
Novarino et al.

(10) Patent No.: US 10,240,268 B2
(45) Date of Patent: Mar. 26, 2019

(54) MELTBLOWN NONWOVEN WEB COMPRISING RECLAIMED POLYPROPYLENE COMPONENT AND RECLAIMED SUSTAINABLE POLYMER COMPONENT AND METHOD OF MAKING SAME

(71) Applicants: Fitesa Germany GmbH, Peine (DE); Fitesa Simpsonville, Inc., Simpsonville, SC (US)

(72) Inventors: Elena Novarino, Hannover (DE); David D. Newkirk, Greer, SC (US); Helmut Hartl, Braunschweig (DE); Stefanie Streich, Edemissen (DE)

(73) Assignees: FITESA SIMPSONVILLE, INC., Simpsonville, SC (US); FITESA GERMANY GMBH, Peine (DE)

( * ) Notice: Subject to any disclaimer, the term of this patent is extended or adjusted under 35 U.S.C. 154(b) by 256 days.

(21) Appl. No.: 15/112,773

(22) PCT Filed: Jan. 23, 2015

(86) PCT No.: PCT/US2015/012658
§ 371 (c)(1),
(2) Date: Jul. 20, 2016

(87) PCT Pub. No.: WO2015/112844
PCT Pub. Date: Jul. 30, 2015

(65) Prior Publication Data
US 2016/0333509 A1  Nov. 17, 2016

Related U.S. Application Data

(60) Provisional application No. 61/931,101, filed on Jan. 24, 2014.

(51) Int. Cl.
*B29B 9/06* (2006.01)
*B29B 13/06* (2006.01)
*D01D 1/04* (2006.01)
*D01D 5/08* (2006.01)
*D01D 5/088* (2006.01)
*D01D 5/098* (2006.01)
*D01D 5/26* (2006.01)
*D01D 7/00* (2006.01)
*D01F 1/10* (2006.01)
*D04H 3/007* (2012.01)
*D04H 3/011* (2012.01)
*D04H 1/4291* (2012.01)
*D04H 1/56* (2006.01)
(Continued)

(52) U.S. Cl.
CPC .......... *D04H 1/4291* (2013.01); *B29B 9/065* (2013.01); *B29B 13/065* (2013.01); *D01D 5/0985* (2013.01); *D04H 1/4266* (2013.01); *D04H 1/4274* (2013.01); *D04H 1/435* (2013.01); *D04H 1/54* (2013.01); *D04H 1/56* (2013.01); *D04H 1/565* (2013.01); *D10B 2321/022* (2013.01)

(58) Field of Classification Search
CPC ........... B29B 9/06; B29B 9/065; B29B 13/06; 29B 13/065; D01D 1/04; D01D 5/08; D01D 5/088; D01D 5/098; D01D 5/0985; D01D 5/26; D01D 7/00; D01F 1/10; D04H 1/4274; D04H 1/4291; D04H 1/435; D04H 1/56; D04H 1/565; D04H 3/007; D04H 3/011
USPC ......... 264/37.28, 37.32, 103, 141, 142, 143, 264/211, 211.12, 518, 555
See application file for complete search history.

(56) References Cited

U.S. PATENT DOCUMENTS 3,338,992 A  8/1967  Kinney
3,692,613 A  9/1972  Pederson
(Continued)

FOREIGN PATENT DOCUMENTS

CN   103069059 A   4/2013
JP   2005-074996 A  3/2005
(Continued)

OTHER PUBLICATIONS

International Search Report and Written Opinion for International Application No. PCT/US2015/012658 dated May 8, 2015.
(Continued)

*Primary Examiner* — Leo B Tentoni
(74) *Attorney, Agent, or Firm* — Alston & Bird LLP

(57) ABSTRACT

Process of preparing meltblown fibers that are reclaimed from a starting material of a polypropylene component and a sustainable polymer component is provided. In one aspect, the method includes blending starting fibers of a polypropylene component and a sustainable polymer component under heat to form a molten stream, and then vis-breaking the components to obtain a polymeric blend that is suitable for use in meltblowing applications. The molten stream of the vis-broken polymer components are extruded through a meltblowing die to form a stream of meltblown fibers that is then collected on a collection surface to form a coherent meltblown web. The starting material may be bicomponent filaments having a sheath-core configuration in which the polypropylene component is oriented in the sheath and the sustainable polymer component is oriented in the core of the filaments. The invention is also directed to meltblown fibers and webs prepared from the process.

20 Claims, No Drawings

(51) Int. Cl.
*D04H 1/4274* (2012.01)
*D04H 1/435* (2012.01)
*D04H 1/4266* (2012.01)
*D04H 1/54* (2012.01)

(56) References Cited

U.S. PATENT DOCUMENTS

| | | | |
|---|---|---|---|
| 3,802,817 | A | 4/1974 | Matsuki et al. |
| 3,849,241 | A | 11/1974 | Butin et al. |
| 4,041,203 | A | 8/1977 | Brock et al. |
| 4,282,076 | A | 8/1981 | Boynton |
| 4,307,143 | A | 12/1981 | Meitner et al. |
| 4,405,297 | A | 9/1983 | Appel et al. |
| 4,707,398 | A | 11/1987 | Boggs |
| 5,108,820 | A | 4/1992 | Kaneko et al. |
| 5,145,727 | A | 9/1992 | Potts et al. |
| 5,162,074 | A | 11/1992 | Hills |
| 5,169,706 | A | 12/1992 | Collier, IV et al. |
| 5,178,931 | A | 1/1993 | Perkins et al. |
| 5,188,885 | A | 2/1993 | Timmons et al. |
| 5,336,552 | A | 8/1994 | Strack et al. |
| 5,344,297 | A | 9/1994 | Hills |
| 5,382,400 | A | 1/1995 | Pike et al. |
| 5,466,410 | A | 11/1995 | Hills |
| 5,525,706 | A | 6/1996 | Gruber et al. |
| 5,665,300 | A | 9/1997 | Brignola et al. |
| 5,807,973 | A | 9/1998 | Gruber et al. |
| 5,814,349 | A | 9/1998 | Geus et al. |
| 6,139,954 | A | 10/2000 | Dean et al. |
| 6,583,076 | B1 | 6/2003 | Pekrul et al. |
| 6,807,973 | B2 | 10/2004 | Fratello et al. |
| 7,956,109 | B2 | 6/2011 | Roth et al. |
| 7,994,078 | B2 | 8/2011 | Reichmann et al. |
| 9,487,893 | B2 | 11/2016 | Moore et al. |
| 9,539,357 | B2 | 1/2017 | Ashraf et al. |
| 9,540,746 | B2 | 1/2017 | Ashraf et al. |
| 2003/0032357 | A1 | 2/2003 | Gillespie et al. |
| 2008/0199673 | A1 | 8/2008 | Allgeuer et al. |
| 2009/0017710 | A1 | 1/2009 | Bugada et al. |
| 2009/0209158 | A1* | 8/2009 | Richeson ........... B01D 39/1623 442/327 |
| 2010/0048081 | A1 | 2/2010 | Topolkaraev et al. |
| 2010/0048082 | A1 | 2/2010 | Topolkaraev et al. |
| 2012/0123374 | A1 | 5/2012 | Richeson et al. |
| 2013/0041335 | A1 | 2/2013 | Dwiggins et al. |
| 2013/0059979 | A1* | 3/2013 | Eswaran ................ D01F 1/10 264/211.12 X |
| 2013/0210308 | A1 | 8/2013 | McEneany et al. |
| 2015/0123304 | A1 | 5/2015 | Ashraf et al. |

FOREIGN PATENT DOCUMENTS

| | | |
|---|---|---|
| JP | 2006-511723 A | 4/2006 |
| JP | 2007-197857 A | 8/2007 |
| JP | 2009-504933 A | 2/2009 |
| JP | 2009-525375 A | 7/2009 |
| JP | 2010-018694 A | 1/2010 |
| JP | 2012-522147 A | 9/2012 |
| WO | WO 2006/027327 A1 | 3/2006 |
| WO | WO 2009/100732 A1 | 8/2009 |
| WO | WO 2009/152349 A1 | 12/2009 |
| WO | WO 2010/012769 A1 | 2/2010 |
| WO | WO 2012/020336 A2 | 2/2012 |
| WO | WO 2012/123374 | 9/2012 |

OTHER PUBLICATIONS

Irgatec CR76 Technology, Presentation BASF (2011) 21 pages.
Office Action for Mexican Patent Application No. MX/a/2016/009479 dated Jun. 14, 2018.
Office Action from Chinese Patent Application No. 201580005327.0 dated Jan. 26, 2018, 4 pages.
Notice of Allowance for Chinese Patent Application No. 201580005327.0 dated Jul. 24, 2018.
Office Action from Chinese Patent Application No. 201580005327.0 dated May 31, 2017, 16 pages.
Office Action from Japanese Patent Application No. 2016-566858 dated Sep. 26, 2017, 5 pages.

* cited by examiner

MELTBLOWN NONWOVEN WEB COMPRISING RECLAIMED POLYPROPYLENE COMPONENT AND RECLAIMED SUSTAINABLE POLYMER COMPONENT AND METHOD OF MAKING SAME

The present invention relates to nonwoven webs, and more particularly to a meltblown web prepared from fibers comprising a blend reclaimed polypropylene component and a reclaimed sustainable polymer component.

BACKGROUND

Traditionally, many materials used in the production of nonwovens are prepared from thermoplastic polymers, such as polyester, polystyrene, polyethylene, and polypropylene. These polymers are generally very stable and can remain in the environment for a long time. Recently, however, there has been a trend to develop articles and products that are considered environmentally friendly and sustainable. As part of this trend, there has been a desire to produce ecologically friendly products comprised of increased sustainable content in order to reduce the content of petroleum based materials.

One promising polymer that may meet this desire is polylactic acid (PLA). Polylactic acid, also known as polylactide, is a renewable thermoplastic, aliphatic polyester derived from renewable resources, such as sugar, starch, or cellulose. PLA is promising because it is manufactured from natural substances, such as corn, and therefore may provide a sustainable alternative to petrochemical-derived products.

However, PLA does not necessarily have the same strength and elongation properties that may be associated with synthetic polymers, such as polyethylenes and polypropylenes. As a result, composite products have been developed that include a PLA component and a synthetic polymer component. One such product is a nonwoven sheet material comprising bicomponent filaments having a PLA core and a polypropylene sheath. Such products have found use in the diaper industry where it is a goal to increase the level of sustainable components in the consumer products.

However, the use of such composite material may also present disadvantages. One such disadvantage is due to the difficulty in reclaiming or recycling materials that are a composite of synthetic and sustainable polymers. As a result, the use of such materials has led to increased costs, which in turn, has limited the use of such materials in commercial products.

Accordingly, a need still exists for improved methods and products for incorporating sustainable polymers, such as PLA, into commercial products.

SUMMARY

Embodiments of the invention are directed to methods of preparing meltblown fibers that are reclaimed from a starting material of a polypropylene component and a sustainable polymer component. In one embodiment, the invention provides a method of preparing a meltblown web in which starting fibers comprised of a polypropylene component and a sustainable polymer component are blended under heat to form a molten stream comprising a blend of the polypropylene component and the sustainable polymer component. The molten stream is then subjected to vis-breaking in which the polypropylene component and the sustainable polymer component are vis-broken so that the vis-broken components are suitable for use in meltblowing applications. The molten stream of the vis-broken polymer components are extruded through a meltblowing die to form a stream of meltblown fibers that is then collected on a collection surface to form a coherent meltblown web. In some embodiments, the meltblown web may be thermally bonded, such as passing the web through a calender roll.

In one embodiment, the starting material comprises bicomponent filaments having a sheath-core configuration in which the polypropylene component is oriented in the sheath and the sustainable polymer component is oriented in the core of the filaments. In some embodiments, the starting material comprises a spunbond web, such as a spunbond web comprising bicomponent filaments.

In some embodiments, vis-breaking is accomplished by blending a vis-breaking agent into the molten stream. In some embodiments, the vis-breaking agent may comprise a peroxide, hydroxylamine ester composition or thio composition. In a preferred embodiment, the vis-breaking agent comprises a hydroxylamine ester.

Aspects of the invention are also directed to meltblown webs comprising the meltblown fibers that are a blend of the reclaimed polypropylene component and the reclaimed sustainable polymer component. In one embodiment, the meltblown web comprises a blend of a reclaimed polypropylene component and a reclaimed polylactic acid component. The invention is also directed to composite sheet structures comprising the meltblown web, such as meltblown/spunbond (MS) laminates, spunbond/meltblown/spunbond (SMS) laminates, and spunbond/meltblown/meltbown/spunbond (SMMS) laminates.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements.

For the purposes of the present application, the following terms shall have the following meanings:

The term "fiber" can refer to a fiber of finite length or a filament of infinite length.

As used herein the term "nonwoven web" means a structure or a web of material which has been formed without use of weaving or knitting processes to produce a structure of individual fibers or threads which are intermeshed, but not in an identifiable, repeating manner. Nonwoven webs have been, in the past, formed by a variety of conventional processes such as, for example, meltblown processes, spunbond processes, and staple fiber carding processes.

As used herein, the term "meltblown" refers to a process in which fibers are formed by extruding a molten thermoplastic material through a plurality of fine, usually circular, die capillaries into a high velocity gas (e.g. air) stream which attenuates the molten thermoplastic material and forms fibers, which can be to microfiber diameter, such as less than 10 microns in diameter. Thereafter, the meltblown fibers are carried by the gas stream and are deposited on a collecting surface to form a web of random meltblown fibers. Such a process is disclosed, for example, in U.S. Pat. No. 3,849,241 to Butin, et al.; U.S. Pat. No. 4,307,143 to Meitner, et al.; and U.S. Pat. No. 4,707,398 to Wisneski, et al., which are incorporated herein in their entirety by reference. Meltblown fibers in accordance with embodiments of the present invention may have circular and non-circular cross sections.

As used herein, the term "spunbond" refers to a process involving extruding a molten thermoplastic material as filaments from a plurality of fine, usually circular, capillaries of a spinneret, with the filaments then being attenuated and drawn mechanically or pneumatically. Based on the configuration of the spinneret orifice, fibers of various cross-section shapes can be produced including circular and non-circular, such as tri-lobal, delta, and the like shaped fibers. The filaments are deposited on a collecting surface to form a web of randomly arranged substantially continuous filaments which can thereafter be bonded together to form a coherent nonwoven fabric. The production of spunbond non-woven webs is illustrated in patents such as, for example, U.S. Pat. Nos. 3,338,992; 3,692,613, 3,802,817; 4,405,297 and 5,665,300. In general, these spunbond processes include extruding the filaments from a spinneret, quenching the filaments with a flow of air to hasten the solidification of the molten filaments, attenuating the filaments by applying a draw tension, either by pneumatically entraining the filaments in an air stream or mechanically by wrapping them around mechanical draw rolls, depositing the drawn filaments onto a collection surface to form a web, and bonding the web of loose filaments into a nonwoven fabric. The bonding can be any thermal or chemical bonding treatment, with thermal point bonding being typical. Other methods such a mechanical and hydroentanglement may also be used.

As used herein "thermal point bonding" involves passing a material such as two or more webs of fibers to be bonded between a heated calender roll and an anvil roll. The calender roll is typically patterned so that the fabric is bonded in discrete point bond sites rather than being bonded across its entire surface.

As used herein the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material, including isotactic, syndiotactic and random symmetries.

As used herein the term "reclaimed", also known as recycled polymer, refers to a polymeric material that was previously extruded once into some product form, such as a fiber, film, or solid plastic component, but then reprocessed back into a form such as a pellet that can be reextruded a second time into a useful fiber, film or solid plastic part.

In many recycle processes significant effort is made to minimize reduction in molecular weight. In other cases a purposeful reduction in molecular weight may be made to convert the recycled polymer into a new molecular weight useful for a specific new purpose.

One example of a process for reclaiming a polymeric material, such as polypropylene, is vis-breaking. In vis-breaking, the previously extruded polymer (e.g., starting material) is subject to a treatment process, chemical, mechanical, or thermal, in which the polymer chains are broken or fractured to produce a reclaimed polymer composition having a molecular weight and melt flow rate that is different than that of the starting material. For instance, in the case of polypropylene, the polypropylene prior to extrusion may have a molecular weight and melt flow rate (MFR) so that the polypropylene polymer was suitable for use in spunbond processes. Following extrusion this polypropylene may then be subject to vis-breaking so as to produce a vis-broken polypropylene component having a molecular weight and MFR that is suitable for use in meltblowing processes. In the present invention, the polymer material that is to be "reclaimed" is subjected to a vis-breaking process.

Embodiments of the present invention are directed to processes for preparing a meltblown fabric comprised of composite meltblown fibers that have been reclaimed from a starting material comprised of a polypropylene component and a sustainable polymer component.

In the context of the present invention, the term "sustainable" refers to a material derived from natural processes such agriculture or forestry that are renewed or replenished to remain available for future generations. Sustainable polymers can thus be contrasted with petroleum sourced polymers where the supply of petroleum is not naturally replenished in a reasonable length of time. Sustainable polymers suitable for embodiments of the present invention typically have a sustainable content that is at least 25 weight percent on the weight percent of the sustainable polymer content, and more typically at least 50 weight percent, with a weight percent of at least 75%, and at least 90% being somewhat more typical. In a preferred embodiment, the sustainable polymer component comprises from 90 to 100 weight percent of sustainable content.

In some embodiments, the sustainable polymer component may comprise biodegradable polymer materials. "Biodegradable" refers to a material or product which degrades or decomposes under environmental conditions that include the action of microorganisms. Thus a material is considered as biodegradable if a specified reduction of tensile strength and/or of peak elongation of the material or other critical physical or mechanical property is observed after exposure to a defined biological environment for a defined time. Depending on the defined biological conditions, a product comprised of sustainable polymer component might or might not be considered biodegradable.

A special class of biodegradable product made with sustainable content might be considered as compostable if it can be degraded in a composing environment. The European standard EN 13432, "Proof of Compostability of Plastic Products" may be used to determine if a fabric or film comprised of sustainable content could be classified as compostable.

In one embodiment, the starting material comprises multicomponent fibers in which the polypropylene component and sustainable polymer component define distinct regions in the fibers. For example, the starting material may comprise bicomponent filaments or fibers which have been formed from at least two polymers extruded from separate extruders but spun together to form one fiber. The polymer components in bicomponent fibers are generally arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another or may be a side-by-side arrangement or an "islands-in-the-sea" arrangement. Examples of bicomponent fibers are described in U.S. Pat. No. 5,108,820 to Kaneko et al., U.S. Pat. No. 5,336,552 to Strack et al., and U.S. Pat. No. 5,382,400 to Pike et al., each of which is incorporated herein in its entirety by reference. Multicomponent fibers may include conventional additives, such as pigments and surfactants that may be incorporated into one or both polymer streams, or applied to the filament surfaces.

In a preferred embodiment, the starting material comprises a bicomponent fiber having a polypropylene sheath and a core comprised of a sustainable polymer component. The ratio of the polypropylene to the sustainable polymer component may range from about 10% polypropylene to 90% sustainable polymer component to 80% polypropylene to 20% sustainable polymer component, and more preferably from 30% polypropylene to 70% sustainable polymer component to 70% polypropylene to 30% sustainable polymer component.

In some embodiments, the sustainable polymer component may be derived from an aliphatic component possessing one carboxylic acid group (or a polyester forming derivative thereof, such as an ester group) and one hydroxyl group (or a polyester forming derivative thereof, such as an ether group) or may be derived from a combination of an aliphatic component possessing two carboxylic acid groups (or a polyester forming derivative thereof, such as an ester group) with an aliphatic component possessing two hydroxyl groups (or a polyester forming derivative thereof, such as an ether group).

The term "aliphatic polyester" covers—besides polyesters which are made from aliphatic and/or cycloaliphatic components exclusively also polyesters which contain besides aliphatic and/or cylcoaliphatic units aromatic units, as long as the polyester has substantial sustainable content. As noted above, the sustainable content is typically at least 25 weight %, and more preferably 75 weight % and even more preferably at least 90 weight %.

Polymers derived from an aliphatic component possessing one carboxylic acid group and one hydroxyl group are alternatively called polyhydroxyalkanoates (PHA). Examples thereof are polyhydroxybutyrate (PHB), poly-(hydroxybutyrate-co-hydroxyvaleterate) (PHBV), poly-(hydroxybutyrate-co-polyhydroxyhexanoate) (PHBH), polyglycolic acid (PGA), poly-(epsilon-caprolactone) (PCL) and preferably polylactic acid (PLA).

Examples of polymers derived from a combination of an aliphatic component possessing two carboxylic acid groups with an aliphatic component possessing two hydroxyl groups are polyesters derived from aliphatic diols and from aliphatic dicarboxylic acids, such as polybutylene succinate (PBSU), polyethylene succinate (PESU), polybutylene adipate (PBA), polyethylene adipate (PEA), polytetramethylene adipate/terephthalate (PTMAT).

In the case of polyesters derived from a combination of an aliphatic component processing two caboxylated acid groups with an aliphatic component possessing two hydroxyl groups either the diacid or the diol or both the diacid and the diol could be comprised of substantial sustainable content. Any of the above polyesters can be used as long as they contain substantial sustainable content.

In the context of the present invention, the PLA grade of the starting material should have proper molecular properties to be spun in spunbond processes. Examples of suitable include PLA grades supplied from NatureWorks LLC, of Minnetonka, Minn. 55345 such as, grade 6752D, 6100D, and 6202D believed to be produced as generally following the teaching of U.S. Pat. Nos. 5,525,706 and 6,807,973 both to Gruber et al.

A wide variety of polypropylene polymers may be used in the starting material including both polypropylene homopolymers and polypropylene copolymers. In one embodiment, the polypropylene of the starting material may comprise a metallocene or Ziegler Natta catalyzed propylene polymers.

Examples of Ziegler Natta polypropylenes that may be used in embodiments of the present invention include TOTAL®3866 polypropylene from Total Petrochemicals USA, INC of Houston, Tex.; Braskem CP 360H polypropylene from Braskem America of Philadelphia, Pa.; ExxonMobil PD 3445 from ExxonMobil of Houston, Tex.; Sabic 511A from Sabic of Sittard, The Netherlands; and Pro-fax PH 835 from Basell Polyolefins of Wilmington, Del. Examples of suitable metallocene polypropylenes may include TOTAL® M3766 polypropylene from Total Petrochemicals USA, INC of Houston, Tex.; TOTAL® MR 2001 polypropylene from Total S.A. of Courbevoie, France; ACHIEVE® 3754 polypropylene from ExxonMobil of Houston, Tex.; and ACHIEVE® 3825 polypropylene from ExxonMobil of Houston, Tex.

The starting material is subjected to a vis-breaking process in which the polypropylene component and sustainable polymer component are visbroken to reduce their average molecular weight. In one embodiment, the vis-breaking of both components may be accomplished under typical vis-breaking conditions and using a propylene vis-breaking agent. However, the sustainable polymer component, for example, PLA, may not require a vis-breaking agent and depolymerization may occur via hydrolysis during the vis-breaking process. Accordingly, it is important to control the moisture content of the starting material so that PLA depolymerization does not proceed to too low a molecular weight such that the combination of PLA and vis-broken polypropylene are no longer useful as raw material for the production of meltblown fabrics.

In some embodiments, the vis-breaking may be accomplished using a vis-breaking agent to facilitate molecular scission of the propylene molecules. In some embodiments, the vis-breaking may also be accomplished using heat (often 300-400° C.), radiation, shear (e.g., using an extruder), combinations of the foregoing techniques, or any other technique which accomplishes the desired level of molecular scission in the propylene molecules and the molecules of the sustainable polymer. It is important to control the moisture level in such processes to insure the hydrolysis and thus depolymerization of the PLA or other polyester does not progress so far that the sustainable polymer component in combination with the vis-broken polypropylene is no longer fit for use in the production of meltblown fabric.

A wide variety of vis-breaking agents may be used in embodiments of the invention. Suitable catalysts may include, for instance, alkyl hydroperoxides and dialkyl peroxides, as disclosed in U.S. Pat. No. 4,282,076, issued to Boynton. One suitable peroxide is 2,5-dimethyl-2,5-bis(t-butylperoxy)hexane. Another suitable peroxide is 2,5-dimethyl-2,5-bis(t-butylperoxy)hexane-3. These peroxides are available under the trade name LUPERSOL® from Pennwalt Corporation.

In a preferred embodiment, the vis-breaking agent comprises a hydroxylamine ester composition or thio composition, such as those described in U.S. Pat. No. 7,956,109, the contents of which are hereby incorporated by reference. An example of a particularly preferred vis-breaking agent is a hydroxylamine ester composition available from BASF under the tradename IRGATEC® CR 76. Advantageously, the vis-breaking agents are peroxide free and do not adversely affect the properties of the resulting vis-broken sustainable polymer component.

The vis-breaking agent may be added to the starting material while the components of the starting material are in a molten state. For instance, the vis-breaking agent may be introduced into the starting material while the components are in a molten state at a temperature from about 180-340° C. For example, the starting material may be heated to a temperature from about 240-340° C., and preferably from about 260-320° C., and more preferably, from about 290-

310° C. In some embodiments, the vis-breaking agent may be introduced into the starting material in an extruder, for example. In general, the amount of heat affects the rate and extent of the vis-breaking.

As discussed previously, the level of moisture present in the combination of sustainable polymer component, for example, PLA, and the polypropylene must be controlled to achieve some hydrolysis of the PLA to achieve some reduction in molecular weight but not depolymerization such that the combination of PLA and polypropylene is no longer fit for use in making a meltblown fabric. The moisture level as measured by methods well known in the art, such as the Karl Fischer method, should be less than about 200 ppm, and in particular, less than about 100 ppm, and more particularly, approximately 50 ppm.

The amount of vis-breaking agent will generally depend on the amount of propylene in the starting material and the desired final melt flow rate of the resulting vis-broken product. In one embodiment, the amount of vis-breaking agent, for example, in embodiments in which the vis-breaking agent comprises a hydroxylamine ester, may be from about 0.5-3% by weight of the propylene polymer, preferably about 0.75-2.5% by weight of the polymer, more preferably about 0.8-1% by weight of the propylene polymer. The desired addition level is generally dependent on temperature during the vis-breaking thus these ranges assume an operating temperature in the range of 270° to 290° C. with the most preferred extruder temperature in the range of 270° to 285° C.

In the case of a vis-breaking agent comprising a peroxide, the amount of peroxide added may be about 0.001-2.0% by weight of the propylene polymer, preferably about 0.1-1.0% by weight of the polymer, more preferably about 0.2-0.7% by weight of the propylene polymer.

The vis-breaking conditions should be selected and controlled so that the vis-broken propylene polymer exhibits sufficient degradation to be useful in processes for preparing a meltblown nonwoven web. In some embodiments, the vis-broken propylene polymer should have a melt flow rate (MFR) in the range of approximately 400 to 2,500 or more preferred from approximately 500 to 2,000, and most preferred from about 700 to 1,800.

The resulting vis-broken starting material results in a blend of the vis-broken polypropylene component and vis-broken and/or hydrolyzed sustainable polymer component. Preferably, the vis-broken blend has an MFR to make it useful for preparation of meltblown nonwoven webs. In one embodiment, the resulting vis-broken blend has an MFR of at least about 400 to 2,500, and preferably from about 500 to 2,000, and more preferably about 700 to 1,800.

The resulting vis-broken starting material, also referred to as reclaimed polymer may be pelletized for future use in the manufacture of meltblown webs, or in a continuous process wherein the reclaimed starting material is immediately extruded and spun into meltblown fibers using conventional techniques.

In some embodiments, the reclaimed blend comprising the polypropylene component and the sustainable polymer component may be blended with virgin polymer (never used) to form meltblown fibers.

Meltblown webs prepared in accordance with embodiments of the present invention comprise a blend of the polypropylene component and the sustainable polymer component that have been reclaimed from the starting material. The meltblown fibers generally have diameters of less than 10 microns, and in particular, diameters of less than 8 microns. In one embodiment, the meltblown fibers have diameters from about 3 to 0.5 microns, and in particular, from about 1 to 2 microns. In some embodiments, the meltblown fibers may have diameters from about 3 to less than 0.5 microns, and in particular from about 1 to 3 microns.

Meltblown webs prepared in accordance with embodiments of the present invention may have a wide variety of basis weight ranges depending on the desired application. For example, meltblown webs and laminates incorporating such meltblown webs may have basis weights ranging from about 0.25 to 20 $g/m^2$, and in particular, from about 1.5 to 3 $g/m^2$. In some embodiments, the meltblown webs may have basis weights ranging from 1 to 400 $g/m^2$, for example, from about 15 to 400 $g/m^2$.

Meltblown webs prepared in accordance with embodiments of the present invention may be used in wide variety of applications. For example, embodiments of the invention may be used for personal care applications, for example products for babycare (diapers, wipes), for femcare (pads, sanitary towels, tampons), for adult care (incontinence products), or for cosmetic applications (pads). In these applications, the meltblown web may be incorporated into a multilayered structure. For example, meltblown webs prepared in accordance with embodiments of the present invention may be used in the production in a variety of different multilayer structures included meltblown/spunbond (MS) laminates, spunbond/meltblown/spunbond (SMS) laminates, and spunbond/meltblown/meltbown/spunbond (SMMS) laminates, for example. In these multilayer structures, the basis weight may range from as low as 0.25 $g/m^2$ and up to 20 $g/m^2$.

In some embodiments in which the meltblown layer is a part of a multilayer structure (e.g., MS, SMS, and SMMS), the amount of the meltblown in the structure may range from about 5 to 20%, and in particular, from about 10 to 15% of the structure as a percentage of the structure as a whole.

In addition, meltblown webs in accordance with embodiments of the present invention may also be used in industrial applications including filters, cleaning products, "pigs" to absorb spilt oil or (if treated with surfactant) to absorb contaminated materials from water, and the like. In these applications, the meltblown webs may have higher basis weight ranges that may range from about 15 to 400 $g/m^2$.

Multilayer structures in accordance with embodiments can be prepared in a variety of manners including continuous in-line processes where each layer is prepared in successive order on the same line, or depositing the meltblown layer on a previously formed spunbond layer. The layers of the multilayer structure can be bonded together to form a multilayer composite sheet material using thermal bonding, mechanical bonding, adhesive bonding, hydroentangling, or combinations of these. In a preferred embodiment, the layers are thermally point bonded to each other by passing the multilayer structure through a pair of calender rolls.

EXAMPLES

Pellets comprised of a blend of PP/PLA are subjected to a vis-breaking process to obtain a molecular weight and MFR suitable for meltblown fiber production. The pellets are obtained from Fitesa's Washougal spunbond plant. In the course of making a polypropylene/polylactic acid (PP/PLA) bicomponent spunbond fabric, waste material is made, such as from slitting the web into rolls or from the start-up of the process. The waste is converted into pellets via heat and pressure via the use of an EREMA Plastic Recycling Machine as available from EREMA North America of Ipswich, Mass. 01938. The resulting pellets have a composition of approximately 50% PLA and 50% PP mixed generally homogenously within the resin pellet. The PLA is a spunbond grade supplied by NatureWorks LLC, of Minnetonka, Minn. 55345; believed made by generally following the teaching of Gruber et al. in U.S. Pat. Nos. 5,525,706 and 5,807,973. The polypropylene is a 35 MFR Ziegler Natta type as commonly used for spunbond applications.

A 500 Kg box of the above described PP/PLA pellets is obtained from Fitesa Washougal, and is subjected to a vis-breaking process to form a meltblown web. This step is carried out at Fitesa's pilot line in Peine, Germany. Before the vis-breaking operation, the PP/PLA pellets are dried overnight via exposure to dry hot air until a moisture level as measured by the Karl Fischer method shows a moisture level of approximately 50 ppm.

Example 1

The Peine pilot line is configured with a Reicofil meltblown spin beam line. The line is initially run with a 35 MFR Spunbond grade polypropylene (PP) resin to which IRGATEC® CR76 is metered into the extruder at a ratio of 0.9 parts CR76 to 99.1 parts PP pellets while increasing the extruder temperature to 275-280° C. The pilot line speed is adjusted with extruder output so a web of PP meltblown at basis weight of 32 GSM is achieved.

The 35 MFR spunbond resin is now replaced with the above described PP/PLA pellets and the level of CR 76 is slowly lowered so the ratio of CD 76 to PP in the pellets (50/50 PP/PLA) is carefully maintained to yield a meltblown web of 32 GSM. During this operation extrusion pressure is monitored to maintain values similar to those seen when processing meltblown grade PP. The pilot line speed is adjusted to match extruder output so a web of PP/PLA meltblown fibers at basis weight of 32 GSM is achieved.

The resulting meltblown web has meltblown fibers comprised of a blend of reclaimed PP and PLA. This new meltblown composition shows surprising and unexpected absorptive and filtration properties. While not bound by theory, the inventors believe that these properties may result from the intimate mixture of hydrophobic PP and slightly hydrophilic PLA polymers within the fibers of the meltblown web.

Example 2

In Example 2 a SMS laminate is made using the meltblown web prepared in Example 1. The pilot line has only one spunbond beam production of in-line made SMS laminates must be simulated by the steps of spinning a web of PP spunbond (at 8 GSM) then spinning the meltblown fibers of Example 1 onto the spunbond layer to make in-line SM followed by laying an previously prepared spunbond web on top of the SM webs. The resulting SMS structure is calendered to produce a thermally bonded SMS laminate. The inventors observe an unexpected and surprising improvement in resistant to delamination of the layers of spunbond PP from the middle layer of the PP/PLA meltblown web. While not being bound by theory, the inventors believe this improvement comes from the intimate mixture of PP and PLA in the meltblown layer which improves and promotes bonding of all layers of the SMS laminate together.

Comparative Example

In this example, a SMS web comprising polypropylene spunbond layers and a meltblown layer of PLA was prepared. The PLA was a meltblown grade available from NatureWorks, PLA Grade 6252D. As in Example 2, a meltblown layer was deposited onto a spunbond polypropylene layer followed be positioning a previously prepared spunbond polypropylene layer. The resulting laminate was then thermally bonded via calendering by passing the laminate through a pair of calendering rolls at a temperature of 130° C. The inventors observed that the resulting SMS laminate exhibited poor lamination strength and that the spunbond layers were easily delaminated from the meltblown layer. At higher bonding temperatures it was observed that the PLA in the meltblown layer migrated through the spunbond layers, which resulted in undesirable adhesion of the nonwoven layers to the surface of the calender roll.

As briefly discussed above, the inventors believe that the blend of the polypropylene and PLA in the reclaimed starting material significantly improves bonding between the layers due to the intimate mixture of PP and PLA in the meltblown layer. This intimate mixture improves and promotes bonding of all layers of the SMS laminate together.

Example 3

In this example, the effects of blending a vis-breaking agent with previously spun polymeric materials comprised of a polypropylene component and a sustainable polymer component on the melt flow rate of the resulting reclaimed polymer blend is characterized. Recycled pellets comprising a composition of approximately 50% PLA and 50% PP as described above were used as the starting material.

The recycled pellets were blended with 5 wt. % Irgatec CR76 as the vis-breaking agent and the melt flow rate was determined in accordance with DIN EN ISO 1133 (230° C., 4 minute heating time at 2.16 KG load). In addition, the melt flow rate of the recycled pellets with no vis-breaking agent, and the melt flow of virgin polypropylene with 5 wt. % of the vis-breaking agent was also evaluated for comparison. The starting melt flow rate of the virgin polypropylene (Sabic Type 519A) is 35 g/10 min at 230° C. per the reported specification of the manufacturer. The results are summarized in the Table below.

| Sample No | Polymer compositions | Amount Vis-breaking agent (wt. %) | MFR (g/10 min at 230° C.) |
| --- | --- | --- | --- |
| 1 | PLA/PP Recycle | 0 | 128 |
| 2 | PLA/PP Recycle | 5 | 169 |
| 3 | Polypropylene | 5 | 101 |

From the above Table, it can be seen that the addition of the vis-breaking agent to the blend of recycled pellets results in an increase in the MFR of the reclaimed blend. This demonstrates that the inventive process is useful in altering the polymer chemistry of the previously spun blend of propylene and PLA such that the melt flow rate is increased and thus should be of increased utility for meltblown applications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed That which is claimed:

1. Process for preparing a meltblown web comprising:
providing starting fibers comprised of a polypropylene component and a sustainable polymer component, wherein each of the components are disposed in distinct regions of the fibers;
blending the polypropylene component and the sustainable polymer component under heat to form a molten stream;
vis-breaking the polypropylene polymer component in the molten stream;
degrading the sustainable polymer component in the molten stream;
extruding the molten stream through a meltblowing die to form a stream of meltblown fibers, wherein the meltblown fibers comprise a blend of reclaimed polypropylene component and the sustainable polymer component; and
collecting the meltblown fibers on a collection surface to form a coherent web, wherein the sustainable polymer component is degraded via vis-breaking.

2. The process of claim 1, wherein the step of vis-breaking comprises blending a vis-breaking agent with the molten stream.

3. The process of claim 2, wherein the vis-breaking agent comprises a hydroxylamine ester composition or thio composition.

4. The process of claim 2, wherein the vis-breaking agent comprises a hydroxylamine ester.

5. The process of claim 2, wherein the amount of vis-breaking agent is from about 0.5 to 3% by weight based on the total weight of the propylene component.

6. The process of claim 2, wherein the amount of vis-breaking agent is from about 0.75 to 2.5% by weight based on the total weight of the propylene component.

7. The process of claim 1, wherein the sustainable polymer component comprises polylactic acid.

8. The process of claim 1, wherein the sustainable content in the sustainable polymer component is from 90 to 100% by weight.

9. The process of claim 1, wherein the sustainable polymer component is degraded via hydrolysis.

10. Process for preparing a meltblown web comprising:
providing starting fibers comprised of a polypropylene component and a sustainable polymer component, wherein each of the components are disposed in distinct regions of the fibers;
blending the polypropylene component and the sustainable polymer component under heat to form a molten stream;
vis-breaking the polypropylene polymer component in the molten stream;
degrading the sustainable polymer component in the molten stream;
extruding the molten stream through a meltblowing die to form a stream of meltblown fibers, wherein the meltblown fibers comprise a blend of reclaimed polypropylene component and the sustainable polymer component; and
collecting the meltblown fibers on a collection surface to form a coherent web, wherein the sustainable polymer component is degraded via hydrolysis and the steps of vis-breaking and degrading occur at substantially the same time.

11. The process of claim 1, wherein the starting fibers comprise bicomponent spunbond filaments wherein the polypropylene component is oriented in a sheath of the filaments and the sustainable polymer component is oriented in a core of the filaments.

12. The process of claim 11, wherein the ratio of the polypropylene component to the sustainable polymer component is from about 10 weight % polypropylene to 90 weight % sustainable polymer component to 80% polypropylene to 20% sustainable polymer component.

13. The process of claim 11, wherein the ratio of the polypropylene component to the sustainable polymer component is from about 30 weight % polypropylene to 70 weight % sustainable polymer component to 70% polypropylene to 30% sustainable polymer component.

14. The process of claim 1, wherein prior to the step of vis-breaking, the blended molten stream of the polypropylene component and the sustainable polymer component are subjected to a step of extruding the blend into a pellet.

15. The process of claim 10, wherein the step of vis-breaking comprises blending a vis-breaking agent with the molten stream.

16. The process of claim 10, wherein the vis-breaking agent comprises a hydroxylamine ester composition or thio composition.

17. The process of claim 10, wherein the vis-breaking agent comprises a hydroxylamine ester.

18. The process of claim 10, wherein the amount of vis-breaking agent is from about 0.5 to 3% by weight based on the total weight of the propylene component.

19. The process of claim 10, wherein the amount of vis-breaking agent is from about 0.75 to 2.5% by weight based on the total weight of the propylene component.

20. The process of claim 10, wherein the sustainable polymer component comprises polylactic acid.

* * * * *